No. 797,728. PATENTED AUG. 22, 1905.
E. B. GIBBS.
AUTOMATIC HAND OPENING GATE.
APPLICATION FILED APR. 13, 1905.
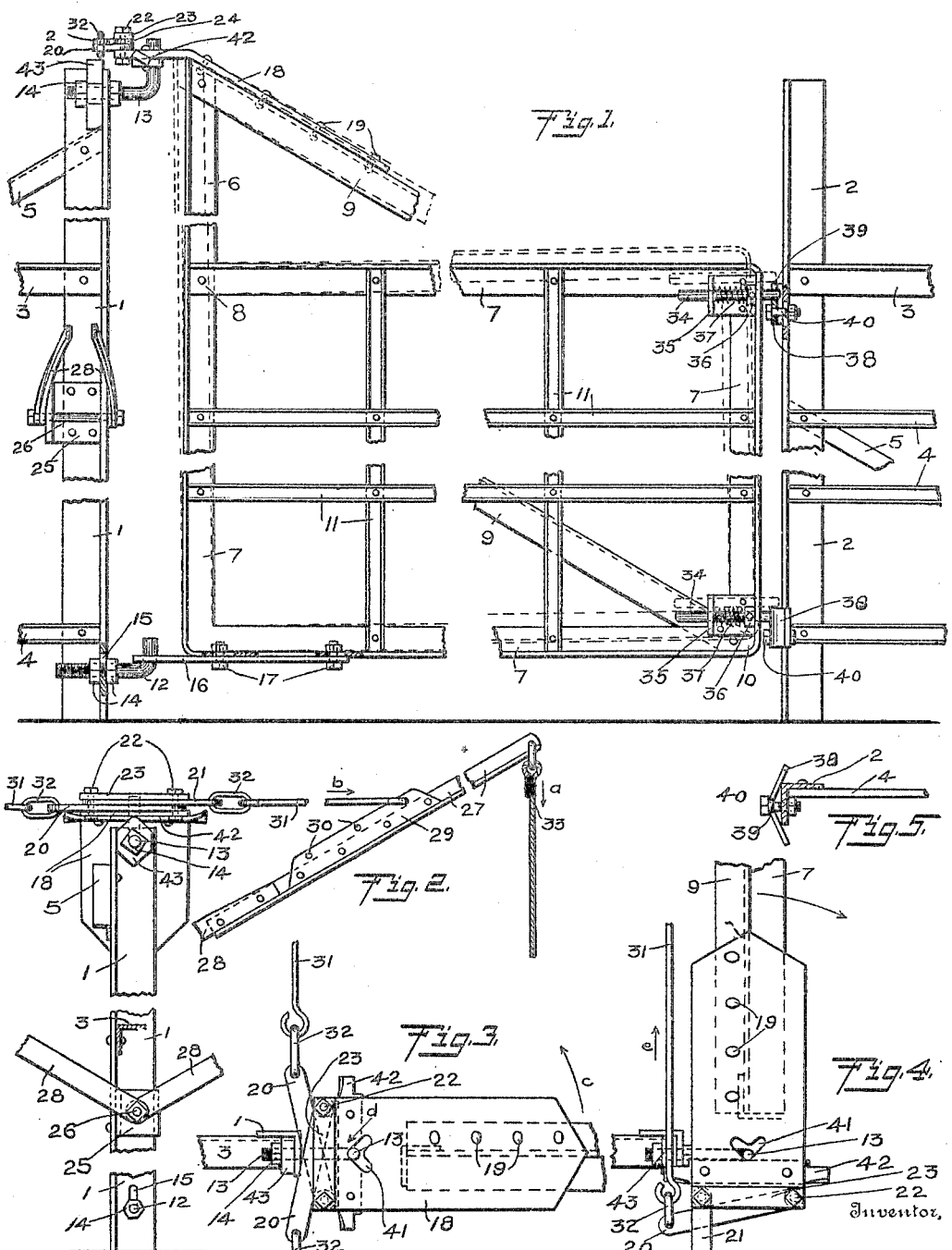
Witnesses:
J. L. Armstrong
L. C. Sharp
Inventor,
Edwin B. Gibbs.
By David O. Barnell
Attorney.

UNITED STATES PATENT OFFICE.

EDWIN B. GIBBS, OF OMAHA, NEBRASKA.

AUTOMATIC HAND-OPENING GATE.

No. 797,728.  Specification of Letters Patent.  Patented Aug. 22, 1905.

Application filed April 13, 1905. Serial No. 256,293.

*To all whom it may concern:*

Be it known that I, EDWIN B. GIBBS, a citizen of the United States, residing at Omaha, in the county of Douglas and State of Nebraska, have invented certain new and useful Improvements in Automatic Hand-Opening Gates, of which the following is a specification.

My invention relates to improvements in automatic hand-opening gates; and the objects of my improvement are to provide a gate of this class which may be constructed at a moderate cost, yet be durable and efficient, in which the latches of the gate may be released by tilting the gate from the hinged end thereof, thereby avoiding the use of positive connecting mechanism for this purpose and enabling the gate to be operated entirely from the hinged end thereof, and in which are embodied certain novel devices for tilting the gate to release the latches, for opening the gate after the latches are released, and for retaining the same in open position.

In the accompanying drawings I have shown a construction embodying my invention, in which—

Figure 1 is a front elevation of the gate, portions thereof being broken away to more clearly illustrate the more remotely-lying parts and to enable the operating mechanism to be shown on a larger scale. Fig. 2 is an elevation of the rear side of the hinge-post and the devices carried thereby and immediately connected therewith. Fig. 3 is a plan view of the operating mechanism adjacent to the upper hinge, showing the position thereof when the gate is closed. Fig. 4 is a similar view showing the position of said mechanism when the gate is open, and Fig. 5 is a detail plan view of one of the latch-sockets carried by the latch-post.

In the construction shown I employ standard rolled-steel-construction shapes for the general framework of the gate, for the posts between which the gate is placed, and for the fence portions adjacent to said posts. Thus the hinge-post 1 and the latch-post 2 are formed from angle-bars, the fence portions connected with said posts are formed from angle-bars 3 and channel-bars 4, and the post-braces 5 are formed from angle-bars. The outer frame 7 of the gate is formed from an angle-bar which is bent to inclose a rectangular space, one end of the bar 6 being prolonged upwardly at the hinged end of the gate, while the other end of the bar is riveted thereto at 8. A diagonal brace 9 is formed by an angle-bar which is fastened to the upper end of the bar 6, extends diagonally across the rectangular framework to the lower outer corner thereof 10, and is secured thereto by riveting. Cross-pieces 11, formed from light channel-bars, are placed both horizontally and vertically across the frame 7 at suitable positions and the same riveted together.

The gate is carried on the post 1 by means of the L-shaped hinge-bolts 12 and 13, which pass through holes in the side of the angle-bar forming said post and are adjustably held in position by nuts 14. The lower bolt 12 is preferably passed through a slotted opening 15, as shown, so that the same may be given a slight vertical adjustment. The upwardly-extending end of the lower bolt 12 passes through the end of the bar 16, which is adjustably secured to the gate-frame 7 by bolts 17, passing through slotted openings in said frame, as shown. The upwardly-extending end of the hinge-bolt 13 passes through an opening in the plate 18, which is secured by rivets 19 to the upper end of the diagonal brace 9. Near the outer corners of the plate 18 the ends of the flat crossed links 20 and 21 are pivotally connected to said plate by the bolts 22. A strap 23, held by said bolts, passes over the links, as shown, and washers 24 of a thickness equal to the links are placed between the link 20 and the strap 23 and the link 21 and plate 18, respectively, whereby the said links are retained in such position that they may move freely past each other. At a suitable height on the post 1 a bracket 25 is secured thereto, and a bolt 26 passes through said bracket and one wing of the angle-bar forming the post. On said bolt are fulcrumed the forked ends of the operating-levers, each of said levers comprising a bar 27, extending diagonally outward and upward from the post 1, the bars 28, riveted to 27 and forming the forked end which straddles the bracket 25 and the post, and the plate 29, riveted to 27 and having the holes 30 therein. Rods 31 are connected by the links 32 to the free ends of the flat crossed links 20 and 21, extending therefrom to the plates 29 and being hooked into the holes 30 therein. The general arrangement of the operating-levers and connecting mechanism is shown in Fig. 2. The said operating-levers are extended outwardly on each side of the gate a suitable distance, and from the ends thereof rods or cords 33 hang down in a suitable position to be grasped by the driver of a vehicle desiring to pass through the gate.

At the free or swinging end of the gate are placed suitable latches, the same in the construction shown, comprising the bolts 34, passing through the brackets 35 and the gate-frame 7, the collars 36 secured on said bolts, and the coil-springs 37 placed between the said collars and the brackets 35 and adapted to push the bolts outwardly until the collars are in engagement with the gate-frame. Latch-sockets, each comprising a bent plate 38 having a notch 39 in the center of the upper edge thereof, are adjustably secured to the post 2 adjacent to the latches by bolts 40 passing through slots in the said post, as shown. When the gate is swung from open to closed position, the latch-bolts 34 are pushed inwardly by the inclined edges of the plates 38 until the notches 39 are reached and the bolts pushed into the same by the springs 37. The latch-bolts may be released from the sockets by tilting the gate-frame as shown by dotted lines in Fig. 1, thereby lifting the bolts out of the notches in the sockets.

The means by which the gate is tilted to release the latches from the sockets are as follows: In the plate 18 the opening 41, through which passes the upwardly-extending end of the hinge-bolt 13, is made substantially heart-shaped, the apex thereof pointing toward the hinged end of the gate and the bolt 13 normally lying in said apex, as shown in Figs. 3 and 4. When a downward pull is given to the cord 33, as shown by arrow $a$ in Fig. 2, the rod 31 is pulled outward, as indicated by arrows $b$, Figs. 2 and 3, said pull being transmitted to the plate 18 by the link 21 and tending to swing the gate in the direction of the arrow $c$, Fig. 3. With the latches in engagement with the sockets and the gate unable to swing in the direction of arrow $c$, the pull exerted on the link 21 causes the plate 18 to be drawn to one side, the inclined side of the opening 41 therein engaging the hinge-bolt 13 and causing the movement of the plate to assume the direction of arrow $d$, Fig. 3. The movement of the plate causes the tilting of the gate-frame before described, releasing the latches from the sockets, and if the pull is continued the gate swings to open position, as will be apparent.

A plate 42 is riveted to the under side of the plate 18 and the protruding ends thereof twisted, as shown, so that the lower surfaces of said ends are slightly inclined. A washer 43 is placed over the hinge-bolt 13 and held in position by the nut 14 thereon. The washer is prevented from turning by the flat side thereof engaging the outer wing of the post and one corner thereof extends above the top of the post, as shown. As the gate swings to open position the inclined surface of one of the ends of the plate 42 engages the washer, and as the gate reaches the limit of its movement it is slightly raised thereby, so that when said plate end passes over the corner of the washer the gate is retained thereby in open position. With the gate in open position a pull upon the rod 31 in the direction of arrow $e$, Fig. 4, will lift the plate end again over the corner of the washer and swing the gate to closed position.

It will be obvious that either of the operating-levers may be used to open the gate, and the same being in open position through the action of one lever may be closed by means of the other lever. It will also appear that the constructions and devices shown may be considerably modified without departing from the spirit of my invention, the constructions shown being those which I consider preferable.

Now, having described my invention, what I claim, and desire to secure by Letters Patent, is—

1. In a gate of the class described, a hinged gate-frame, means for retaining the gate in closed position, said retaining means being releasable by tilting of the gate-frame, operating-levers, links attached to the gate-frame on opposite sides of the hinge-axis thereof, the said links crossing each other and each extending to the opposite side of the hinge-axis from that on which it is attached to the gate-frame, means connecting the operating-levers with said crossed links, and means whereby a tension upon one of the said links will first tilt the gate-frame to release the retaining means therefor and then swing the same to open position.

2. In a gate of the class described, a hinged gate-frame, latches for retaining same in closed position, said latches being releasable by tilting the gate-frame, links connected with the gate-frame on opposite sides of the hinge-axis thereof, operating-levers connected with said links, means by which the actuation of either of the operating-levers and the link connected therewith may tilt the gate-frame to release the latches, the arrangement being such that continued actuation of the lever and link will swing the gate to open position, and means for retaining the gate in open position when swung thereto.

In testimony whereof I have hereunto subscribed my name in the presence of two witnesses.

EDWIN B. GIBBS.

Witnesses:
L. C. SHARP,
D. O. BARNELL.